United States Patent
Okada et al.

(10) Patent No.: US 8,396,982 B2
(45) Date of Patent: Mar. 12, 2013

(54) INFORMATION PROCESSOR, METHOD FOR PROCESSING INFORMATION, COMPUTER PROGRAM, AND SEMICONDUCTOR DEVICE

(75) Inventors: Michihiro Okada, Tokyo (JP); Hideki Sato, Kanagawa (JP); Shusuke Utsumi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 294 days.

(21) Appl. No.: 12/373,214

(22) PCT Filed: Aug. 10, 2007

(86) PCT No.: PCT/JP2007/065986
§ 371 (c)(1),
(2), (4) Date: Feb. 12, 2009

(87) PCT Pub. No.: WO2008/020616
PCT Pub. Date: Feb. 21, 2008

(65) Prior Publication Data
US 2009/0319679 A1    Dec. 24, 2009

(30) Foreign Application Priority Data
Aug. 18, 2006  (JP) .................................. 2006-222946

(51) Int. Cl.
*G06F 15/16* (2006.01)
(52) U.S. Cl. ........................................ 709/232; 711/100
(58) Field of Classification Search ............... 709/230
See application file for complete search history.

(56) References Cited

U.S. PATENT DOCUMENTS

| | | | |
|---|---|---|---|
| 6,622,151 B1 * | 9/2003 | Hamamoto et al. | 709/232 |
| 6,658,247 B1 | 12/2003 | Saito | |
| 6,766,376 B2 * | 7/2004 | Price | 709/231 |
| 7,222,342 B2 * | 5/2007 | Hata et al. | 709/222 |

(Continued)

FOREIGN PATENT DOCUMENTS

| | | | |
|---|---|---|---|
| JP | 2000253453 A | 9/2000 |
| JP | 2001014285 A | 10/2000 |

(Continued)

OTHER PUBLICATIONS

International Search Report and Written Opinion for International application PCT/JP2007/065986.

(Continued)

*Primary Examiner* — Jeffrey R Swearingen
(74) *Attorney, Agent, or Firm* — Matthew B. Dernier, Esq.; Gibson & Dernier LLP

(57) ABSTRACT

To provide a device for downloading a digital content file, an information processor stores, in an external storage device, a digital content file obtained from a server through a network through packet communication, where the information processor includes a download control section for keeping a recording area having a size which is equal to the data size of the digital content file in the external storage device and storing the packets in order from the earliest to the latest obtained, in this recording area; and a resume data generation section for generating a resume data indicating the progress of obtaining the digital content file, and the download control section stores the resume data in the subject recording area and removes the resume data from the recording area when the last packet is obtained.

13 Claims, 10 Drawing Sheets

U.S. PATENT DOCUMENTS

| | | | |
|---|---|---|---|
| 7,289,817 B2 * | 10/2007 | Chun | 709/227 |
| 7,343,435 B2 * | 3/2008 | Graham | 709/224 |
| 2002/0152315 A1 * | 10/2002 | Kagan et al. | 709/228 |
| 2002/0161856 A1 * | 10/2002 | Pineau et al. | 709/219 |
| 2002/0162111 A1 | 10/2002 | Shimizu et al. | |
| 2007/0043867 A1 * | 2/2007 | Shigeta | 709/226 |
| 2008/0231900 A1 * | 9/2008 | Abe | 358/1.16 |

FOREIGN PATENT DOCUMENTS

| | | |
|---|---|---|
| JP | 2001265359 A | 9/2001 |
| JP | 2002359833 A | 12/2002 |
| JP | 2003006995 A | 1/2003 |
| JP | 2003348152 A | 12/2003 |
| KR | 2000-0062677 | 10/2000 |
| KR | 2002-0076114 | 10/2002 |

OTHER PUBLICATIONS

Office Action for corresponding Korean Application 10-2009-7003312, dated Oct. 28, 2010.

Office Action for corresponding Japanese Application 2006-222946, dated Jun. 21, 2011.

International Preliminary Report on Patentability and Written Opinion for corresponding PCT application PCT/JP2007/065986, dated Feb. 24, 2009.

* cited by examiner

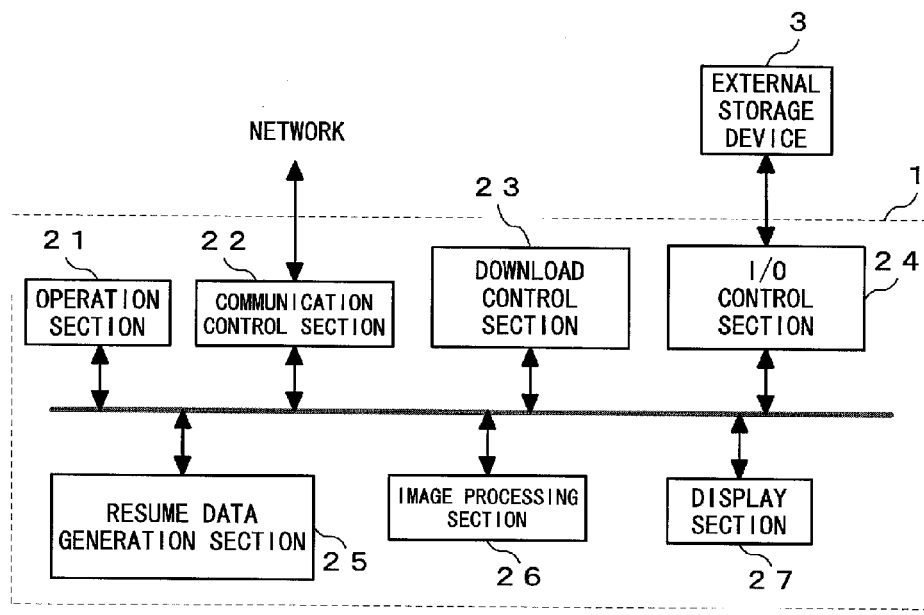

FIG. 3

| FIRST HEADER | Ver. INFORMATION | POSITION INFORMATION | FIRST SIZE INFORMATION | NUMBER OF CHARACTERS IN URL | URL VALUE | NUMBER OF CHARACTERS IN LMD | LMD VALUE |
|---|---|---|---|---|---|---|---|
| TYPE/UUID/MDAT/MOOV PRESENT/ABSENT INFORMATION, MDAT1/2 UPDATE INFORMATION | | | TYPE LENGTH | UUID LENGTH | MDAT START POSITION | FIRST MDAT LENGTH | SECOND MDAT LENGTH |
| MOOV START OPSITION | MOOV LENGTH | REPRODUCTION TIME | SECOND SIZE INFORMATION | SECOND HEADER | | | |

FIG. 4

| TYPE | UUID | MDAT | MOOV |
|---|---|---|---|

FIG. 5

| | | | | | | |
|---|---|---|---|---|---|---|
| (i) | | | | | | |

| (ii) | | RESUME DATA |
|---|---|---|

| (iii) | TYPE | | RESUME DATA |
|---|---|---|---|

| (iv) | TYPE | UUID | | RESUME DATA |
|---|---|---|---|---|

| (v) | TYPE | UUID | RESUME DATA | |
|---|---|---|---|---|

| (vi) | TYPE | UUID | RESUME DATA | | MOOV |
|---|---|---|---|---|---|

| (vii) | TYPE | UUID | | RESUME DATA | MOOV |
|---|---|---|---|---|---|

| (viii) | TYPE | UUID | MDAT | | RESUME DATA | MOOV |
|---|---|---|---|---|---|---|

| (ix) | TYPE | UUID | MDAT | | RESUME DATA | MOOV |
|---|---|---|---|---|---|---|

| (x) | TYPE | UUID | MDAT | RESUME DATA | MOOV |
|---|---|---|---|---|---|

| (xi) | TYPE | UUID | MDAT | MOOV |
|---|---|---|---|---|

FIG. 9

| FIRST HEADER | Ver. INFORMATION | POSITION INFORMATION | FIRST SIZE INFORMATION | NUMBER OF CHARACTERS IN URL | URL VALUE | NUMBER OF CHARACTERS IN LMD | LMD VALUE |
|---|---|---|---|---|---|---|---|
| TYPE/UUID/MOOV PRESENT/ABSENT INFORMATION | TYPE LENGTH | UUID LENGTH | NUMBER OF MDAT DATA BLOCKS | MDAT_(n) PRESENT/ABSENT INFORMATION, MDAT_(n) LENGTH UPDATE | | | |
| MDAT_(1) START POSITION | FIRST MDAT_(1) LENGTH | SECOND MDAT_(1) LENGTH | MDAT_(2) START POSITION | FIRST MDAT_(2) LENGTH | SECOND MDAT_(2) LENGTH | | |
| SECOND MDAT_(3) LENGTH | ... | | MDAT_(n) START POSITION | FIRST MDAT_(n) LENGTH | SECOND MDAT_(n) LENGTH | | |
| MOOV START POSITION | MOOV LENGTH | REPRODUCTION TIME_(1) | REPRODUCTION TIME_(2) | REPRODUCTION TIME_(3) | ... | REPRODUCTION TIME_(n) | |
| SECOND SIZE INFORMATION | SECOND HEADER | | | | | | |

F I G. 1 1

| TYPE | UUID | MDAT_(1) | MDAT_(2) | MDAT_(3) | MDAT_(4) | MDAT_(5) | ... | MDAT_(n) | MOOV |

FIG. 12

| | | | | | | |
|---|---|---|---|---|---|---|
| (viii) | TYPE | UUID | MDAT_(1) | | | RESUME DATA | MOOV |
| (viii-i) | TYPE | UUID | MDAT_(1) | MDAT_(3) | | RESUME DATA | MOOV |
| (viii-ii) | TYPE | UUID | MDAT_(1) | MDAT_(3) | MDAT_(5) | RESUME DATA | MOOV |
| (viii-iii) | TYPE | UUID | MDAT_(1) | MDAT_(2) | MDAT_(3) | MDAT_(5) | RESUME DATA | MOOV |
| (ix) | TYPE | UUID | MDAT_(1) | MDAT_(2) | MDAT_(3) | MDAT_(4) | MDAT_(5) | RESUME DATA | MOOV |
| (x) | TYPE | UUID | MDAT_(1) | MDAT_(2) | MDAT_(3) | MDAT_(4) | MDAT_(5) | RESUME DATA | MOOV |
| (xi) | TYPE | UUID | MDAT_(1) | MDAT_(2) | MDAT_(3) | MDAT_(4) | MDAT_(5) | ... | MDAT_(n) | MOOV |

F I G. 1 3

INFORMATION PROCESSOR, METHOD FOR PROCESSING INFORMATION, COMPUTER PROGRAM, AND SEMICONDUCTOR DEVICE

TECHNICAL FIELD

The present invention relates to a device and method for downloading digital content, that is, content such as, for example, music, video images, and various programs, from a server.

BACKGROUND OF THE INVENTION

Digital content files are available for downloading through a network such as the Internet. Any instrument can be used for downloading as long as being capable of connecting to the network. Wireline communication using a personal computer and the like is an example. In addition, those having wireless communication capabilities may also be used such as cell phones, PDAs (Personal Digital Assistants), and the like. Some gaming devices are connectable to a network in order to download, for example, a game program. Furthermore, portable gaming devices can also connect to a network through wireless communication. A user can enjoy downloaded digital content on his or her portable gaming device.

Recent development of the network infrastructure makes it possible to download a digital content file of a large data size to portable information processors such as portable gaming devices, cell phones, and PDAs, through wireless communication. However, download of content to a portable information processor can sometimes be interrupted due to, for example, a lower transmission rate than would be expected because of unstable wireless communication, low battery charge, or removal of an external storage device on which digital content is to be stored. Interruption of the download results in a waste of time and communication expenses required for the download.

SUMMARY OF THE INVENTION

An object of the present invention is to provide a device and a method for downloading digital content through a network.

An information processor according to the present invention that solves the aforementioned problems is an information processor for obtaining a digital content file through a network and storing it into a predetermined storage device. This information processor comprises resume data generation means for generating a resume data including at least information indicating the progress of obtaining said digital content file; and download control means that creates a recording area of a size that is equal to the data size of said digital content file, in said storage device, obtains a series of divided data blocks in a predetermined order, the divided data blocks being obtained by breaking up said digital content file, stores the divided data blocks in order from the earliest to the latest obtained, in said recording area along with said resume data, and removes the resume data from said recording area when the last one of the divided data blocks is obtained.

Since the recording area is formed at the beginning and the divided data blocks are stored in it in order from the earliest to the latest obtained, any storage capacity that is larger than that of the recording area is not required in the storage device. In addition, the progress of downloads can be monitored by using the resume data, and even when a download of a digital content file is interrupted, the download can be resumed at the point at which it was interrupted. The resume data is also generated at the beginning. Since it is stored in the recording area, no other recording area is necessary. The resume data is removed when the last divided data block is obtained. Therefore, no recording area is required other than the recording area that is created at the beginning in order to obtain a digital content file.

Said information indicating the progress of obtaining said digital content file represents, for example, the progress for each one of said divided data blocks. In such a case, said resume data generation means is adapted to update, when said download control means obtains a divided data block, said information indicating the progress of obtaining said digital content file corresponding to the obtained divided data block. With the aforementioned structure, the progress of the download can be monitored for each one of the divided data blocks. For example, when the digital content file contains two or more story scenarios, it is possible to see which story scenarios have already been obtained which are not.

In addition, said resume data generation means is adapted to update said resume data every time when, for example, a predetermined number of said divided data blocks are obtained. With the aforementioned structure, the resume data always represents the latest progress of the download.

Such the resume data includes, for example, at least information indicating a source from which said digital content file is being downloaded and information indicating the amount of data of the downloaded portion of said digital content file. When the resume data includes these pieces of information, if a download of said digital content file is interrupted before the last one of the divided data blocks is obtained, said download control means identifies the subject digital content file according to the information in said resume data indicating the source from which said digital content file is being downloaded, and determines the amount of data of the remaining portion of the digital content file according to the information indicating said amount of data of the downloaded portion of said digital content file, to obtain the remaining portion of the digital content file and store it in said storage device, whereby the download of the digital content file can be resumed.

The information processor according to the present invention may comprise, for example, communication control means for use in access to said network in a wireless manner. In this case, said digital content is obtained through wireless communication. In addition, it may further comprise, for example, reproduction means for reproducing a content file after reading said divided data blocks from said recording area when the number of the divided data blocks recorded in said storage device reaches a predetermined number. In this case, the digital content file can be reproduced while the download of the content file is in progress.

Said download control means appropriately moves the position where said resume data is stored, within said recording area, depending on, for example, the position where the obtained one of the divided data blocks is stored.

Another information processor according to the present invention is an information processor comprising communication control means for exchanging data with a server that is capable of delivering one or more digital content files; I/O control means for use in accessing a predetermined storage device; download control means for previously creating a recording area in said storage device, the recording area having a size which is equal to the data size of a predetermined digital content file to be obtained from said server, receiving, from said communication control means, divided data blocks one by one, the divided data blocks being obtained by breaking up said digital content file from said server, and storing said divided data blocks in order from the earliest to the latest obtained in said recording area by said I/O control means; and resume data generation means for generating a resume data indicating the progress of obtaining said digital content file, the resume data being updated every time when a predetermined number of said divided data blocks are stored in said recording area; said download control means stores said resume data generated by said resume data generation means in said recording area, and removes said resume data from said recording area when the last one of said divided data blocks of said digital content is obtained.

A method for processing information according to the present invention is a method to be carried out by an information processor connected to a predetermined storage device, the information processor being capable of performing packet communication with a server that is capable of delivering one or more digital content files, the method comprising the steps of: request a downloaded of a predetermined digital content file to said server; creating a recording area in said storage device, the recording area having a size which is equal to the data size of said digital content file; generating a resume data indicating the progress of obtaining said digital content file to store it in said recording area; obtaining a series of divided data blocks in a predetermined order, the divided data blocks being obtained by breaking up said digital content file; storing said divided data blocks in order from the earliest to the latest obtained; updating said resume data stored in said recording area every time when a predetermined number of said divided data blocks are obtained; and removing said resume data from said recording area when the last one of the divided data blocks is obtained.

When said information processor comprises the steps of determining whether or not the total size of said divided data blocks stored in said recording area reaches a predetermined size; and reproducing the stored divided data blocks when the total size of the stored divided data blocks reaches said predetermined size, the digital content file can be reproduced while the download of the digital content file is in progress.

If a download of said digital content file is interrupted before all of said divided data blocks are obtained, said information processor further comprises the step of reading said resume data from said storage device to obtain the remaining divided data blocks of the subject digital content file according to the progress of the download indicated by the resume data, whereby the download of the digital content file is resumed.

A computer program according to the present invention is a computer program that directs a computer system connected to a predetermined storage device, the computer system being capable of performing packet communication with a server that is capable of delivering one or more digital content files, to perform a series of processing of request a downloaded of a predetermined digital content file to said server; creating a recording area in said storage device, the recording area having a size which is equal to the data size of said digital content file; generating a resume data indicating the progress of obtaining said digital content file to store it in said recording area; obtaining a series of divided data blocks in a predetermined order, the divided data blocks being obtained by breaking up said digital content file; storing said divided data blocks in order from the earliest to the latest obtained; updating said resume data stored in said recording area every time when a predetermined number of said divided data blocks are obtained; and removing said resume data from said recording area when the last one of the divided data blocks is obtained.

Such a computer program is provided by means of, for example, being recorded on a computer readable recording medium.

A semiconductor device according to the present invention is a semiconductor device which is mounted on an information processor for use in obtaining a digital content file through a network and storing it in a predetermined storage device, the semiconductor device being adapted to form, in this information processor, resume data generation means for generating a resume data including at least information indicating the progress of obtaining said digital content file; and download control means that creates a recording area of a size that is equal to the data size of said digital content file, in said storage device, obtains a series of divided data blocks in a predetermined order, the divided data blocks being obtained by breaking up said digital content file, stores the divided data blocks in order from the earliest to the latest obtained, in said recording area along with said resume data, and removes the resume data from said recording area when the last one of the divided data blocks is obtained.

The present invention as described above ensures a positive download of a digital content file.

BRIEF DESCRIPTION OF THE DRAWINGS

FIG. 3 is an exemplified view showing a functional block to be formed in the information processor;

FIG. 4 is an exemplified view showing a format of a resume data;

FIG. 5 is an exemplified view showing a format of a digital content file;

FIG. 9 is an exemplified view showing the transition of the state in a recording area;

FIG. 11 is another exemplified view showing a format of a resume data;

FIG. 12 is another exemplified view showing a format of a digital content file; and FIG. 13 is another exemplified view showing the transition of the state in a recording area.

DETAILED DESCRIPTION OF THE INVENTION

Now, an embodiment of a content delivery system is described with reference to the drawings, wherein an information processor is used to which the present invention is applied.

Figure 1:
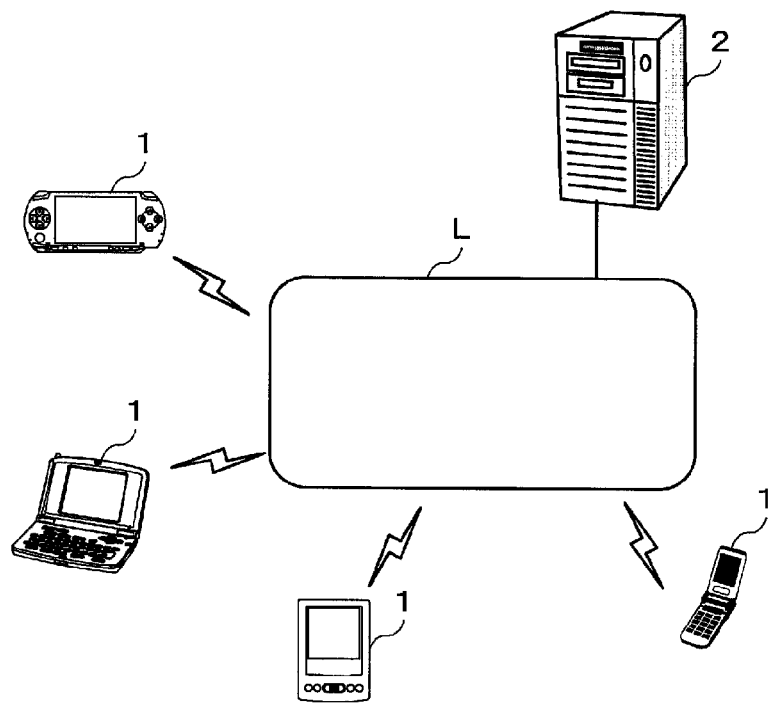
FIG. 1 is a configuration diagram of a content delivery system which comprises an information processor and a server.

FIG. 1 is a configuration diagram of a content delivery system comprising the information processor to which the present invention is applied and a server which provides digital content files to be delivered. In this embodiment, the information processor 1 is implemented by a portable information processor such as a cell phone, a PDA, a mobile personal computer, or a portable gaming device. The portable information processor is allowed to connect to a network L through wireline or wireless communication. A server 2 can provide one or more digital content files, and delivers a digital content file in response to a download request from the information processor 1. The server 2 comprises, for example, an application server, a content server, and a license server. The application server is for sending a delivery trigger file which is used to direct the information processor 1 to perform download, to the information processor 1. The content server is for delivering a digital content file to the information processor 1. The license server is for permitting delivery of a digital content file to the information processor 1. The network L is a communication network such as the Internet or a LAN (Local Area Network). The network L is allowed to perform wireless communication with the information processor 1. Through the network L, various data, programs, and the like are exchanged between the information processor 1 and the server 2.

The data exchange between the information processor 1 and the server 2 is achieved through, for example, packet communication with the data divided into separate blocks. This means that a digital content file is broken up into small pieces and transmitted from the server 2 to the information processor 1.

Figure 2:
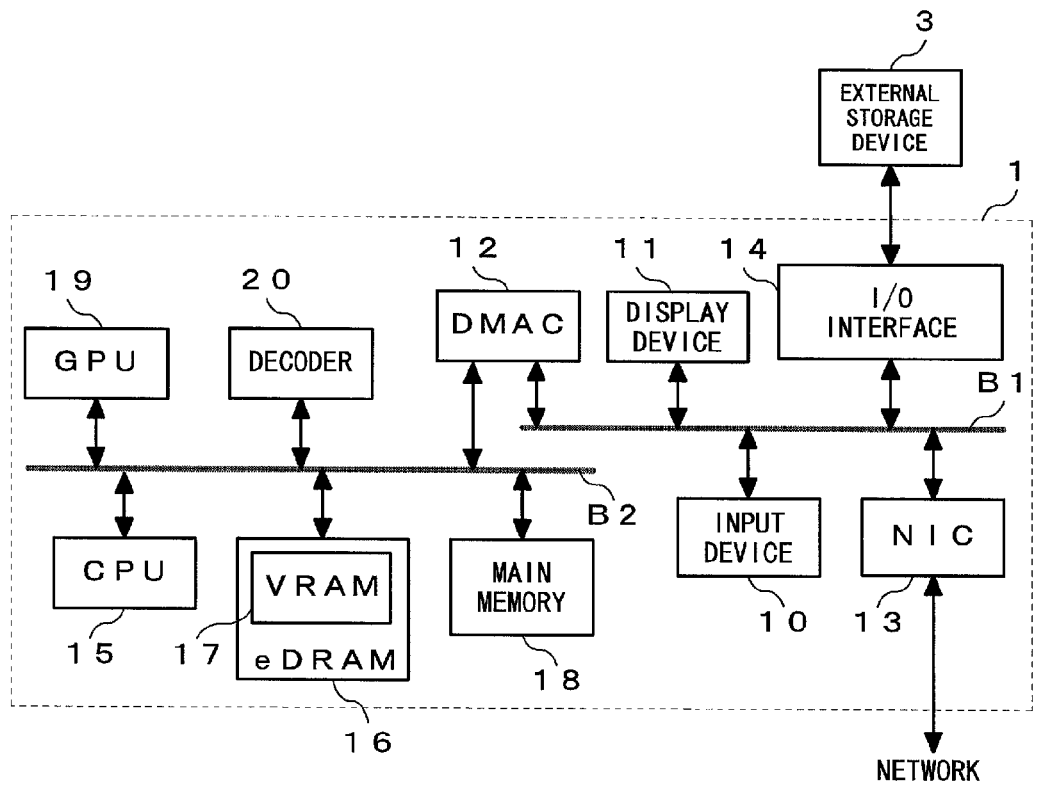
FIG. 2 is an exemplified view showing a hardware configuration of the information processor.

FIG. 2 is an exemplified view showing a hardware configuration of the information processor 1.

An external storage device 3 is connected to the information processor 1. The external storage device 3 contains a rewritable memory (e.g., a flash memory) therein, and is accessed from the information processor 1 to write and read data into and from it. Although this embodiment uses the external storage device 3, an internal storage device may be used in place of it. The information processor 1 has a first bus B1 and a second bus B2. Connected to the first bus are: an input device 10, a display device 11, a direct memory access controller (DMAC: Direct Memory Access Controller) 12, a NIC (Network Interface Card) 13, and an I/O interface 14. Connected to the second bus B2 are: a CPU (Central Processing Unit) 15, eDRAM (Embedded Dynamic Random Access Memory) 16 including VRAM (Video Random Access Memory) 17, a main memory 18 implemented as RAM (Random Access Memory), a GPU (Graphics Processing Unit) 19, and a decoder 20. Input and output of the data are mainly performed by the components connected to the first bus B1. Processing of the data is mainly performed by the components connected to the second bus B2.

The input device 10 is an input mechanism that cooperates with an input button and/or the display device 11 such as a touch panel and the like which are/is provided on the information processor 1. A user can input various instructions by using the input device 10.

The display device 11 is an FPD (Flat Panel Display) such as a liquid crystal display. Images, text strings, and the like obtained from a digital content file are displayed on the display device 11.

The DMAC 12 controls DMA transfers between the components connected to the first bus B1 and the second bus B2. The DMAC 12 allows data transfer between the components connected to the first bus B1 as well as the components connected to the second bus B2.

The NIC 13 is an interface for establishing connection between the information processor 1 and the network L through wireline or wireless communication. When the information processor 1 is connected to the network L through a cell phone network, a mechanism of a conventional cell phone is used to connect to the Internet in place of the NIC 13.

The I/O interface 14 controls access from the information processor 1 to the external storage device 3. The information processor 1 writes and reads data into and from the external storage device 3 through the I/O interface 14. As the I/O interface 14, for example, a USB (Universal Serial Bus) may be used.

The CPU 15 is a semiconductor device which loads a boot program stored in ROM which is not shown during the boot sequence for the information processor 1, and executes the boot program to operate an operating system. It also reads programs and data from the external storage device 3 and stores them on the main memory 18. The CPU 15 controls the operation of other components in the information processor 1.

The eDRAM 16 is a semiconductor device wherein the VRAM 17 implemented as RAM and a logic circuit are integrated together.

The GPU 19 is a semiconductor device which performs three-dimensional graphics processing in cooperation with the eDRAM 16 and writes the generated image data into the VRAM 17. The image data written into the VRAM 17 is produced as an image on the display device 11.

The decoder 20 operates in parallel with the CPU 15 and decompresses the data that has compressed into MPEG (Moving Picture Experts Group) format, JPEG (Joint Photographic Experts Group) format, or the like.

FIG. 3 is an exemplified view showing a functional block to be formed in the information processor 1 shown in FIG. 2 when the CPU 15 loads and executes a computer program according to the present invention in cooperation with other components. Formed in the information processor 1 are functional blocks of: an operation section 21, a communication control section 22, a download control section 23, an I/O control section 24, a resume data generation section 25, an image processing section 26, and a display section 27.

The operation section 21 is embodied by the input device 10 and the CPU 15. It accepts an instruction received through the input device 10. The instructions received by the operation section 21 include, for example, a login name and a password required to log into the server 2, a choice of a desired digital content file, and a download instruction.

The communication control section 22 is embodied by the NIC 13 and the CPU 15. It exchanges data with the server 2 through the network L. The communication control section 22 in this embodiment is adapted to access the network L in a wireless manner.

The download control section 23 is embodied by the CPU 15. It controls operations of downloading digital content files. The download control section 23 receives a digital content file from the server 2 through the communication control section 22, and stores it on the external storage device 3 through the I/O control section 24. In storing the digital content file, the resume data which represents the status of the download of a digital content file is stored in the storage area in which the digital content file is to be stored. The resume data is removed before the digital content file is successfully downloaded and recorded on the external storage device 3.

The I/O control section 24 is embodied by the I/O interface 14 and the CPU 15. It writes and reads the content data into and from the external storage device 3.

The resume data generation section 25 is embodied by the CPU 15. It generates the resume data and sends it to the download control section 23. The resume data includes information about the server from which a file is being downloaded, and the information about the data size of the digital content file being downloaded. FIG. 4 is an exemplified view showing a format of such the resume data.

The resume data in FIG. 4 includes a first header which indicates that this data is the resume data; version information which is updated when a specification of the resume data is changed; position information indicating at which location the resume data is stored; first size information indicating the size of the resume data (the size from the beginning of the first header to the end of a second header); the number of characters in URL (Uniform Resource Locator) indicating the number of characters in the URL of the source server of the digital content file; an URL value that represents the subject URL; the number of characters in LMD (Last Modified Date) indicating the number of characters in a character string representing the date on which the digital content file has last modified in the source server; an LMD value indicating the date on which the digital content file has last modified in the source server; TYPE/UUID/MDAT/MOOV present/absent information and MDAT1/2 update information which indicates whether or not the TYPE, UUID, MDAT, and MOOV have stored as well as whether or not MDAT has 1/2 stored; a TYPE length indicating the length of a stored TYPE; a UUID length indicating the length of a stored UUID; an MDAT start position indicating a storage start position for the MDAT; first and second MDAT lengths indicating the lengths of a stored MDAT; an MOOV start position indicating a storage start position for the MOOV; an MOOV length indicating the length of a stored MOOV; a reproduction time for which reproduction is performed during a download session; second size information which is identical to the first size information; and the second header which is identical to the first header information.

The first MDAT length and the second MDAT length both indicate the lengths of the stored MDAT but they are different from the viewpoint of new data and old data. In other words, information about the length of the stored MDAT is updated while the next preceding information is left.

The image processing section 26 is embodied by the decoder 20, the GPU 19, the eDRAM 16, and the CPU 15. The image processing section 26 reads the content data (in this case, image data) from the external storage device 3 through the I/O control section 24, decodes it, and performs a predetermined image processing. As a result of the image processing, image data is recorded on the VRAM 17.

The display section 27 is embodied by the display device 11 and the CPU 15. It produces an image obtained from the image data recorded on the VRAM 17 on the display device 11. This allows a user to see the image reproduced from the digital content file.

The information processor 1 usually has a mechanism capable of producing audio, in addition to the above-mentioned components, but description thereof is omitted for the purpose of facilitating the description.

FIG. 5 is an exemplified view showing an MP4 format which is an example of a format of a digital content file delivered from the server 2 to the information processor 1 in such the content delivery system.

Files in the MP4 format are structured as boxes. An example shown in FIG. 5 is structured as TYPE, UUID, MDAT, and MOOV boxes. The TYPE is a data box which is located at the head of the MP4 data and identifies details the file is compatible with. The UUID is an extension box which is unique for each encoder. The MDAT carries the data stream of the content itself, such as images and audio. The MDAT may be divided into multiple portions. The MOOV possesses meta-data, timing details, and the like of the header information and the content for each track (e.g., video and audio).

Figure 6:
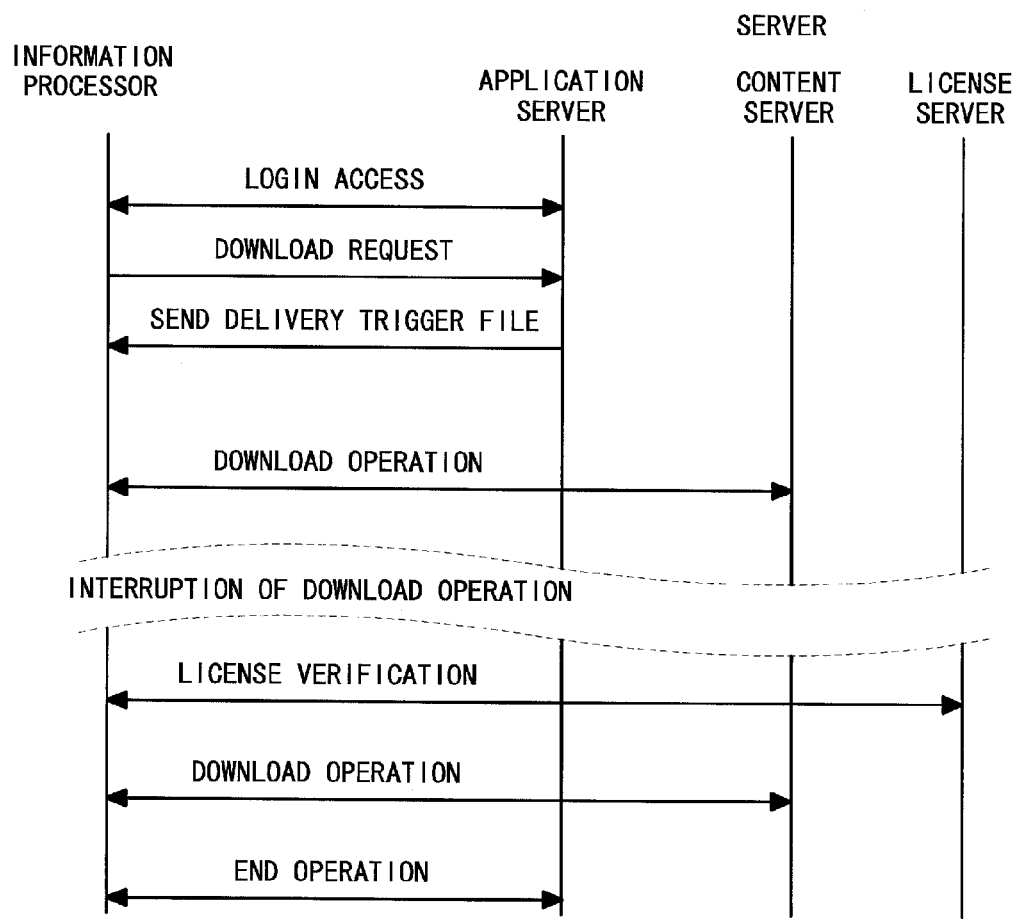
FIG. 6 is a process chart illustrating how a digital content file is downloaded.

FIG. 6 is a process chart illustrating how a digital content file is downloaded from the server 2 by using the aforementioned information processor 1. This shows operations performed between the information processor 1 and the server 2.

In this example, the server 2 comprises an application server, a content server, and a license server.

For downloading digital content, login access to the server is first performed by the information processor 1. In the server 2, the application server controls this login. A user of the information processor 1 is allowed to download a digital content file from the server 2 after being logged in. The login is initiated when a user enters his or her login name and a password by using the information processor 1, as is done conventionally. The entered login name and password are supplied to the server 2 through the network L. The application server in the server 2 authenticates the user according to the received login name and password to allow the user to download a content file. The server 2 generates a transaction ID during the authentication of the user.

After being logged in, the user sends a request to download a desired digital content file by using the information processor 1. The operations starting from the login to the download request may be performed through, for example, a browser on the information processor 1. It can be done by means of, for example, connecting to the application server from the information processor 1 using a browser.

In response to the download request, the server 2 generates a delivery trigger file which includes a URL that specifies the location of the requested digital content file (the URL of the content server in this embodiment) and a URL that specifies the location of a license file (the URL of the license server in this embodiment) and sends it to the information processor 1. The transaction ID generated during the login operation is added to the URL that specifies the location of the license file. The transaction ID is not added to the URL that specifies the location of the digital content file, so that the file can be downloaded regardless of the user authentication. By using the delivery trigger file, it is possible to prevent any unauthorized access for downloading the content file.

The information processor 1 executes the received delivery trigger file to perform a download of the desired digital content file from the content server. The information processor 1 generates a resume data at the beginning of the download operation, and removes the resume data before the end of the download operation. If the download is not interrupted, the download is thus completed at the step just mentioned. However, if the download is interrupted, the following steps are further taken after being resumed.

First, a license is verified between the information processor 1 and the license server to confirm that the user is an authenticated user who has access to the digital content file for downloading. After completion of the license verification, the information processor 1 continues to download the remaining part of the digital content file according to the resume data. When the download has completed, predetermined operations such as a logoff operation are performed by the information processor 1, the server 2, and the application server.

Figure 7:
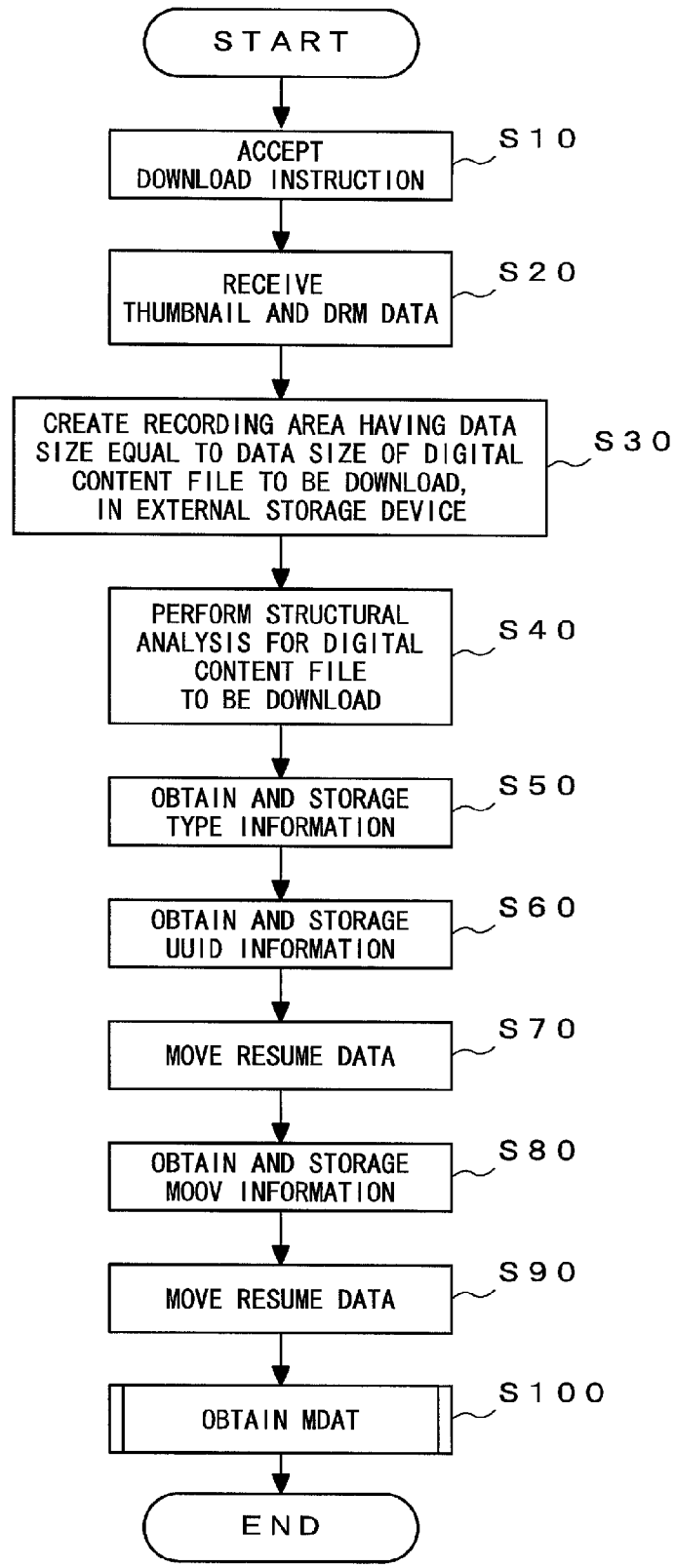
FIG. 7 is a detailed process flow chart showing steps involved in a download.
Figure 8:
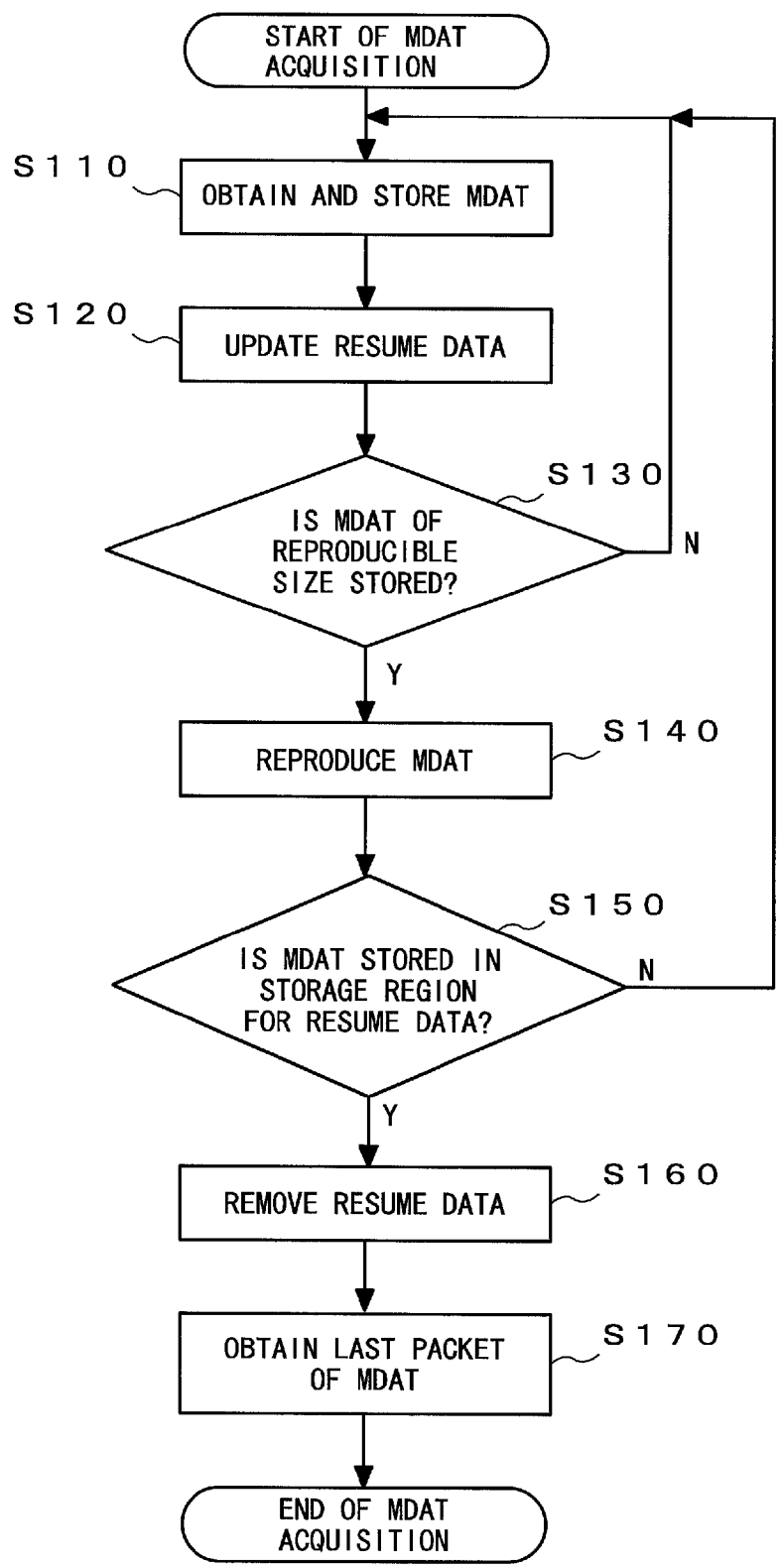
FIG. 8 is a detailed process flow chart showing steps involved in a download.

Referring to FIGS. 7 to 9, how to download a digital content file is described in detail. FIGS. 7 and 8 are detailed process flow charts each showing download operations. FIG. 9 is a view showing the transition of the state in a recording area where a digital content file is recorded in the external storage device 3 during a download.

In response to an instruction from a user to download a predetermined digital content file through the operation section 21, the information processor 1 sends a download request to the server 2 (step S10). The user chooses a desired digital content file and makes a download instruction by using, for example, a browser screen displayed on the display device 19 in the information processor 1. In this embodiment, the digital content file to be downloaded has a data size which is generally equal to the storage capacity of the external storage device 3.

In response to the download instruction, the download control section 23 in the information processor 1 receives DRM (Digital Rights Management) data and a thumbnail file for the designated digital content file, from the server 2 (step S20). When only one of the thumbnail file and the DRM data is provided on the server 2, the information processor 1 receives only the provided one. When neither one is provided, the step S20 is omitted.

Next, the download control section 23 in the information processor 1 receives information about the data size and the data structure of the digital content file to be downloaded from the server 2, and creates a recording area having a data size which is equal to the data size of the digital content file, in the external storage device 3 (step S30, FIG. 9 (*i*)). After creating the recording area, the information processor 1 performs structural analysis for the digital content file in question according to the information about the data structure, by the resume data generation section 25, generates a resume data, and writes it into the recording area (step S40, FIG. 9 (*ii*)). The structural analysis for the digital content file shows the position and the size of the TYPE, UUID, MOOV, and MDAT for the digital content file. With this, the resume data generation section 25 generates a resume data. The resume data is recorded at the tail of the recording area.

Next, the download control section 23 in the information processor 1 obtains the TYPE from the server 2 and stores it at a predetermined position within the recording area. After storing the TYPE, the resume data is updated by the resume data generation section 25 (step S50, FIG. 9 (*iii*)). The resume data being updated indicates that the TYPE has been obtained.

After storing the TYPE and updating the resume data, the download control section 23 obtains the UUID from the server 2 and stores it at a predetermined position within the recording area. After storing the UUID, the resume data is updated by the resume data generation section 25 (step S60, FIG. 9 (*iv*)). The resume data being updated indicates that the UUID has been obtained.

After storing the UUID and updating the resume data, the information processor 1 changes the position where the resume data is stored, from the tail of the recording area to the position just after the UUID (step S70, FIG. 9 (*v*)). Next, the download control section 23 in the information processor 1 obtains the MOOV from the server 2 and stores it at a predetermined position within the recording area. After storing the MOOV, the resume data is updated by the resume data generation section 25 (step S80, FIG. 9 (*vi*)). The resume data being updated indicates that the MOOV has been obtained.

After storing the MOOV and updating the resume data, the information processor 1 changes the position where the resume data is recorded, from the position just after the UUID to the position just ahead of the MOOV (step S90, FIG. 9 (*vii*)). Next, the download control section 23 in the information processor 1 obtains the MDAT and stores it (step S100). How to obtain and store the MDAT is described in detail with reference to FIG. 8. The information processor 1 and the server 2 exchange data after breaking up the data into pieces, as in the case of packet communications. The MDAT is not as small as can be transmitted at once through packet communications. Therefore, it is broken up into multiple pieces with a size applicable for communication.

First, the download control section 23 obtains a first MDAT packet and stores it at a predetermined position within the recording area (step S110). After storing the first MDAT packet, the resume data is updated by the resume data generation section 25 (step S120, FIG. 9 (*viii*)). The resume data being updated indicates that the first MDAT packet has been obtained.

Next, the image processing section 26 in the information processor 1 determines whether the MDAT packet stored in the recording area of the external storage device 3 has an enough size for reproduction (step S130). If it does not have an enough size for reproduction (step S130: N), the process returns to the step 110 to obtain a next MDAT packet and stores it at a predetermined position within the recording area (FIG. 9 (*ix*)). If it has a reproducible size (step S130: Y), the image processing section 26 reads and reproduces the MDAT required for reproduction at a predetermined region from the external storage device 3, and then displays the content on the display section 27 (step S140).

Next, the download control section 23 in the information processor 1 determines whether or not the MDAT packet should be stored in a region of the recording area where the resume data is recorded (step S150). If it is not stored (step S150: N), the process returns to the step 110 to obtain a next MDAT packet and stores it at a predetermined position within the recording area (FIG. 9 (*ix*)). If it is stored (step S150: Y, FIG. 9 (*x*)), the resume data is removed from the recording area (step S160). Subsequently, the download control section 23 obtains the last MDAT packet and stores it at a predetermined position within the recording area (step S170, FIG. 9 (*xi*)). In this way, a download of the digital content file is completed. The content can be reproduced during the download, i.e., so-called streaming distribution is available. In addition, the resume data makes it possible to continuously track or monitor the progress of a download of a digital content file. Even if a download is interrupted, it can be resumed easily.

Figure 10:
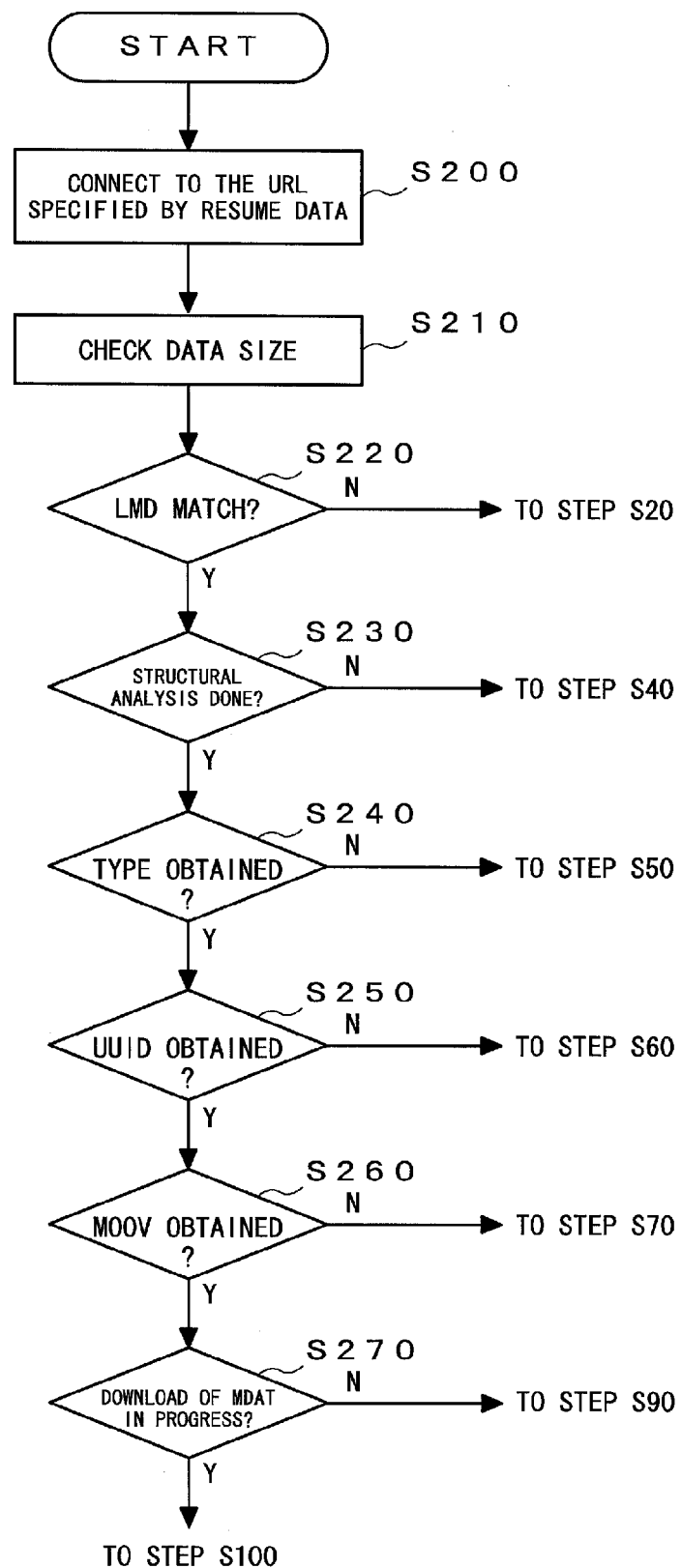
FIG. 10 is a process flow chart showing steps involved in resuming a download.

FIG. 10 is a process flow chart showing steps involved in resuming a download after interruption of it.

Upon resuming a download, the download control section 23 in the information processor 1 reads the resume data from the recording area in the external storage device 3, checks the information included in the resume data that indicates the server from which a file is being downloaded, and connects to the server in question by using the communication control section 22 (step S200). For example, the URL value shown in FIG. 4 indicates the URL of the server 2, so this server is the connection target.

Next, the download control section 23 confirms that the data size of the digital content file to be downloaded from the connection target is equal to the size of the recording area created in the external storage device 3 (step S210). If the sizes are not identical as a result of confirmation, the process will be terminated.

If the sizes are identical, the download control section 23 compares the LMD value of the digital content file on the server 2 with the LMD value of the resume data to determine whether or not the digital content file is updated (step S220). If the LMD values do not match (step S220: N) to show that the digital content file has been updated, the download of the digital content file is resumed from the step S20 in FIG. 7.

If the LMDs match (step S220: Y), the progress of the download is determined by using the resume data. The download control section 23 determines whether the structural analysis has already been completed or not by means of determining whether or not the TYPE length, the UUID length, and the MOOV length of the resume data are identical to the lengths of the TYPE, UUID, and MOOV included in the digital content file on the server 2 (step S230). If the structural analysis has not yet completed (step S230: N), the download of the digital content file is resumed from the step S40 in FIG. 7.

If the structural analysis has already been completed (step S230: Y), the download control section 23 determines whether the TYPE has already been obtained or not according to the TYPE/UUID/MDAT/MOOV present/absent information and the MDAT1/2 update information in the resume data (step S240). If the TYPE has not yet been obtained (step S240: N), the download of the digital content file is resumed from the step S50 in FIG. 7.

If the TYPE has already been obtained (step S240: Y), the download control section 23 determines whether the UUID has already been obtained or not according to the TYPE/UUID/MDAT/MOOV present/absent information and the MDAT1/2 update information in the resume data (step S250). If the UUID has not yet been obtained (step S250: N), the download of the digital content file is resumed from the step S60 in FIG. 7.

If the UUID has already been obtained (step S250: Y), the download control section 23 determines whether the MOOV has already been obtained or not according to the TYPE/UUID/MDAT/MOOV present/absent information and the MDAT1/2 update information in the resume data (step S260). If the MOOV has not yet been obtained (step S260: N), the download of the digital content file is resumed from the step S70 in FIG. 7.

If the MOOV has already been obtained (step S260: Y), the download control section 23 determines whether a download of the MDAT is in progress or not according to the TYPE/UUID/MDAT/MOOV present/absent information and the MDAT1/2 update information in the resume data (step S270). If the download of the MDAT is not in progress (step S270: N), the download of the digital content file is resumed from the step S90 in FIG. 7.

If the download of the MDAT is in progress (step S270: Y), the download control section 23 determines the data size of the recorded MDAT according to the first and second MDAT lengths of the resume data to see what is in progress and find finished MDAT downloads. Subsequently, a download of the remaining MDAT is resumed at the step S100 in FIG. 7.

As apparent from the above, a recording area is first provided in the external storage device 3 wherein the recording area has a data size which is equal to the data size of the digital content file. The digital content file is stored in the recording area along with the resume data during the download(s). The resume data is removed when the download is completed. This makes it possible to obtain the digital content file without using any excessive recording area. In addition, the resume data shows the progress of downloads, so that a download can be resumed at the point at which it was interrupted even when it happens. Furthermore, the digital content file can be reproduced even when downloads are in progress.

FIG. 11 is another exemplified view showing a format of the resume data. When the resume data has the illustrated format, it is useful for downloads in cases where the MDAT is broken up into MDAT_(1) to MDAT_(n), as shown in FIG. 12. Although the MDAT may be broken up depending on the size of the packets, it may be broken up depending on a story scenario of a movie, a game program, and the like in FIG. 12. Each of the MDAT_(1) to MDAT_(n) represents a single story scenario.

The resume data in FIG. 11 includes a first header which indicates that this data is the resume data; version information which is updated when a specification of the resume data is changed; position information indicating at which location the resume data is stored; first size information indicating the size of the resume data (the size from the beginning of the first header to the end of a second header); the number of characters in URL indicating the number of characters in the URL (Uniform Resource Locator) of the source server of the digital content file; an URL value that represents the subject URL; the number of characters in LMD (Last Modified Date) indicating the number of characters in a character string representing the date on which the digital content file has last modified in the source server; an LMD value indicating the date on which the digital content file has last modified in the source server; TYPE/UUID/MOOV present/absent information which indicates whether or not the TYPE, UUID, and MOOV have stored; a TYPE length indicating the length of a stored TYPE; a UUID length indicating the length of a stored UUID; the number of MDAT data blocks indicating the number of divided MDAT blocks; MDAT_(n) present/absent information which indicates whether or not each of the divided MDAT blocks is stored; MDAT_(n) length update information indicating the number of the updates of each MDAT length; an MDAT_(1) start position indicating a storage start position for the MDAT_(1); first and second MDAT_(1) lengths indicating the lengths of a stored MDAT_(1); an MDAT_(2) start position indicating a storage start position for the MDAT_(2); first and second MDAT_(2) lengths indicating the lengths of a stored MDAT_(2); an MDAT_(n) start position indicating a storage start position for the MDAT_(n); first and second MDAT_(n) lengths indicating the lengths of a stored MDAT_(n); an MOOV start position indicating a storage start position for the MOOV; an MOOV length indicating the length of a stored MOOV; a reproduction time_(1) indicating the time duration of the MDAT_(1) reproduced when a download of the MDAT_(1) is in progress; a reproduction time (2) indicating the time duration of the MDAT_(2) reproduced when a download of the MDAT_(2) is in progress; a reproduction time_(n) indicating the time duration of the MDAT_(n) reproduced when a download of the MDAT_(n) is in progress; second size information which is identical to the first size information; and the second header which is identical to the first header information.

The first MDAT_(n) length and the second MDAT_(n) length both indicate the lengths of the stored MDAT but they are different from the viewpoint of new data and old data. In other words, information about the length of the stored MDAT_(n) is updated while the next preceding information is left.

Such the resume data includes the information about the presence and absence as well as the update information for each of the MDAT_(1) to MDAT_(n). Therefore, downloads can be manages for each of the MDAT_(1) to MDAT_(n). This means that it is possible to download the MDAT_(1) to MDAT_(n) in any order as shown in FIG. 11 as well as downloading the MDAT from the beginning as shown in FIG. 8.

In FIG. 13, the MDAT is downloaded in the order of: MDAT_(1)→MDAT_(3)→MDAT_(5)→MDAT_(2)→MDAT_(4)→ . . . MDAT_(n). The resume data is updated every time when the download of each of the MDAT_(1) to MDAT_(n) is completed. Thus, it is easy to see what is in progress and find finished downloads for each of the MDAT_(1) to MDAT_(n) by using the resume data. In addition, they may be downloaded from a desired story scenario in response to, for example, an instruction from a user. Furthermore, a download of the MDAT can be made at a high speed if a network allows a divisional download.

The invention claimed is:

1. An information processor for obtaining a digital content file through a network and storing it into a predetermined storage device, comprising:
resume data generation means for generating a resume data including at least information indicating a progress of obtaining said digital content file; and
download control means that creates a recording area of a size that is equal to a data size of said digital content file, in said storage device, obtains a series of divided data blocks in a predetermined order, the divided data blocks being obtained by breaking up said digital content file, stores the divided data blocks in order from an earliest to a latest obtained, in said recording area along with said resume data, and removes the resume data from said recording area when a last one of the divided data blocks is obtained, wherein
said information indicating the progress of obtaining said digital content file represents progress for each one of said divided data blocks,
said resume data generation means being adapted to update, when said download control means obtains a divided data block, said information indicating the progress of obtaining said digital content file corresponding to the obtained divided data block, and
said download control means moves a position where said resume data is stored, within said recording area, depending on a position where the obtained one of the divided data blocks is stored.

2. The information processor as claimed in claim 1, wherein said resume data generation means is adapted to update said resume data every time when a predetermined number of said divided data blocks are obtained.

3. The information processor as claimed in claim 1, wherein said resume data includes at least information indicating a source from which said digital content file is being downloaded and information indicating an amount of data of the downloaded portion of said digital content file.

4. The information processor as claimed in claim 3, wherein, if a download of said digital content file is interrupted before the last one of the divided data blocks is obtained, said download control means identifies the subject digital content file according to the information in said resume data indicating the source from which said digital content file is being downloaded, and determines an amount of data of a remaining portion of the digital content file according to the information indicating said amount of data of the downloaded portion of said digital content file, to obtain the remaining portion of the digital content file and store it in said storage device.

5. The information processor as claimed in claim 1, comprising communication control means for use in access to said network in a wireless manner,
said digital content being obtained through wireless communication.

6. The information processor as claimed in claim 1, further comprising reproduction means for reproducing a content file after reading said divided data blocks from said recording area when the number of the divided data blocks recorded in said recording area reaches a predetermined number.

7. An information processor comprising:
communication control means for exchanging data with a server that is capable of delivering one or more digital content files;
I/O control means for use in accessing a predetermined storage device;
download control means for creating a recording area in said storage device prior to a reception, the recording area having a size which is equal to a data size of a predetermined digital content file to be obtained from said server, receiving, from said communication control means, divided data blocks one by one, the divided data blocks being obtained by breaking up said digital content file from said server, and storing said divided data blocks in order from an earliest to a latest obtained in said recording area by said I/O control means; and
resume data generation means for generating a resume data indicating a progress of obtaining said digital content file, the resume data being updated every time when a predetermined number of said divided data blocks are stored in said recording area, and said download control means moves a position where said resume data is stored, within said recording area, depending on a position where the obtained one of the divided data blocks is stored;
said download control means stores said resume data generated by said resume data generation means in said recording area, and removes said resume data from said recording area when the last one of said divided data blocks of said digital content is obtained.

8. A method for processing information to be carried out by an information processor connected to a predetermined storage device, the information processor being capable of performing packet communication with a server that is capable of delivering one or more digital content files, the method comprising the steps of:
requesting a download of a predetermined digital content file to said server;
creating a recording area in said storage device, the recording area having a size which is equal to a data size of said digital content file;
generating a resume data indicating a progress of obtaining said digital content file;
storing said resume data in said recording area;
obtaining a series of divided data blocks in a predetermined order, the divided data blocks being obtained by breaking up said digital content file;
storing said divided data blocks in order from an earliest to a latest obtained;
moving a position where said resume data is stored, within said recording area, depending on a position where the obtained one of the divided data blocks is stored;
updating said resume data stored in said recording area every time when a predetermined number of said divided data blocks are obtained; and
removing said resume data from said recording area when a last one of the divided data blocks is obtained.

9. The method for processing information as claimed in claim 8, wherein said information processor comprises the steps of:
determining whether or not the total size of said divided data blocks stored in said recording area reaches a predetermined size; and
reproducing the stored divided data blocks when the total size of the stored divided data blocks reaches said predetermined size.

10. The method for processing information as claimed in claim 8, wherein, if a download of said digital content file is interrupted before all of said divided data blocks are obtained, said information processor further comprises the step of:
reading said resume data from said storage device to obtain the remaining divided data blocks of the subject digital content file according to the progress of the download indicated by the resume data.

11. A computer system connected to a predetermined storage device, the computer system being capable of performing packet communication with a server that is capable of delivering one or more digital content files, the computer system comprising:

a non-transitory computer readable storage medium having stored thereon a computer program that directs the computer system to perform a series of processing steps, comprising:

requesting a download of a predetermined digital content file to said server;

creating a recording area in said storage device, the recording area having a size which is equal to a data size of said digital content file;

generating a resume data indicating the progress of obtaining said digital content file;

storing said resume data in said recording area;

obtaining a series of divided data blocks in a predetermined order, the divided data blocks being obtained by breaking up said digital content file;

storing said divided data blocks in order from an earliest to a latest obtained data block within said recording area;

moving a position where said resume data is stored, within said recording area, depending on a position where the obtained one of the divided data blocks is stored;

updating said resume data stored in said recording area every time when a predetermined number of said divided data blocks are obtained; and removing said resume data from said recording area when the last one of the divided data blocks is obtained.

12. A non-transitory computer readable recording medium containing a computer program that directs a computer system connected to the recording medium, the computer system being capable of performing packet communication with a server that is capable of delivering one or more digital content files, to perform a series of processing steps, comprising:

requesting a download of a predetermined digital content file to said server;

creating a recording area in said storage device, the recording area having a size which is equal to a data size of said digital content file;

generating a resume data indicating a progress of obtaining said digital content file;

storing the resume data in said recording area;

obtaining a series of divided data blocks in a predetermined order, the divided data blocks being obtained by breaking up said digital content file;

storing said divided data blocks in order from an earliest to a latest obtained;

moving a position where said resume data is stored, within said recording area, depending on a position where the obtained one of the divided data blocks is stored;

updating said resume data stored in said recording area every time when a predetermined number of said divided data blocks are obtained; and removing said resume data from said recording area when the last one of the divided data blocks is obtained.

13. A semiconductor device which is mounted on an information processor for use in obtaining a digital content file through a network and storing it in a predetermined storage device, the semiconductor device being adapted to form, in this information processor, resume data generation means for generating a resume data including at least information indicating a progress of obtaining said digital content file; and download control means that creates a recording area of a size that is equal to a data size of said digital content file, in said storage device, obtains a series of divided data blocks in a predetermined order, the divided data blocks being obtained by breaking up said digital content file, stores the divided data blocks in order from an earliest to a latest obtained, in said recording area along with said resume data, and removes the resume data from said recording area when the last one of the divided data blocks is obtained and said download control means moves a position where said resume data is stored, within said recording area, depending on a position where the obtained one of the divided data blocks is stored, wherein said information indicating the progress of obtaining said digital content file represents progress for each one of said divided data blocks, and said resume data generation means being adapted to update, when said download control means obtains a divided data block, said information indicating the progress of obtaining said digital content file corresponding to the obtained divided data block.

* * * * *